US012700350B2

(12) United States Patent
Liu et al.

(10) Patent No.: US 12,700,350 B2
(45) Date of Patent: Aug. 4, 2026

(54) COLOR SHIFT COMPENSATION METHOD OF DISPLAY PANEL AND DISPLAY DEVICE

(71) Applicant: Tianma Advanced Display Technology Institute (Xiamen) Co., Ltd., Xiamen (CN)

(72) Inventors: Yiting Liu, Xiamen (CN); Peixuan Chen, Xiamen (CN); Tianyi Wu, Xiamen (CN); Yiwen Luo, Xiamen (CN)

(73) Assignee: Tianma Advanced Display Technology Institute (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 19/040,305

(22) Filed: Jan. 29, 2025

(65) Prior Publication Data

US 2026/0004713 A1 Jan. 1, 2026

(30) Foreign Application Priority Data

Jun. 26, 2024 (CN) ......................... 202410841678.6

(51) Int. Cl.
*G09G 3/32* (2016.01)

(52) U.S. Cl.
CPC ....... *G09G 3/32* (2013.01); *G09G 2320/0242* (2013.01); *G09G 2320/0276* (2013.01); *G09G 2320/041* (2013.01); *G09G 2330/021* (2013.01)

(58) Field of Classification Search
CPC ............. G09G 3/32; G09G 2320/0242; G09G 2320/0276; G09G 2320/041; G09G 2330/021
See application file for complete search history.

(56) References Cited

U.S. PATENT DOCUMENTS

| | | | | |
|---|---|---|---|---|
| 12,067,935 | B2 * | 8/2024 | Hou | G09G 3/3208 |
| 2012/0212520 | A1 * | 8/2012 | Matsui | G09G 3/3611 345/101 |
| 2023/0401989 | A1 | 12/2023 | Park et al. | |
| 2025/0014526 | A1 * | 1/2025 | Ran | G09G 3/36 |

FOREIGN PATENT DOCUMENTS

| | | | |
|---|---|---|---|
| CN | 110111724 | A | 8/2019 |
| CN | 110767148 | A | 2/2020 |
| CN | 112863439 | A | 5/2021 |

* cited by examiner

*Primary Examiner* — Gene W Lee
(74) *Attorney, Agent, or Firm* — Anova Law Group, PLLC

(57) ABSTRACT

Color shift compensation method of display panel and display device are provided. The display panel includes a plurality of display pixels arranged in rows and columns The method includes acquiring initial display parameters of a plurality of display pixels and an ambient temperature of the display panel; determining an actual temperature of the display panel according to the initial display parameters of the plurality of display pixels and the ambient temperature of the display panel; determining a compensation gamma table of the display panel according to the actual temperature of the display panel; and providing compensation data signals to the plurality of the display pixels according to the compensation gamma table.

19 Claims, 11 Drawing Sheets

COLOR SHIFT COMPENSATION METHOD OF DISPLAY PANEL AND DISPLAY DEVICE

CROSS-REFERENCE TO RELATED APPLICATION

This application claims priority of Chinese Patent Application No. 2024108416786, filed on Jun. 26, 2024, the entire contents of which are hereby incorporated by reference.

FIELD OF THE DISCLOSURE

The present disclosure generally relates to the field of display technology and, more particularly, relates to a color shift compensation method of a display panel and a display device.

BACKGROUND

A human eye's perception of brightness is non-linear; that is, for small changes in brightness, a human eye is relatively sensitive in dark areas, but less sensitive in bright areas. To compensate for nonlinear perception, a display device simulates perceptual characteristics of the human eye through gamma debugging and stores a corresponding gamma table.

When displaying an image, the display device drives a display panel using a pre-stored gamma table, ensuring that the image's color and brightness are more aligned with a natural perception of the human eye. At same time, a contrast, shadow details, and a color reproduction of the image can be optimized.

BRIEF SUMMARY OF THE DISCLOSURE

One aspect of the present disclosure provides a color shift compensation method of display panel. The display panel includes a plurality of display pixels arranged in rows and columns The method includes acquiring initial display parameters of a plurality of display pixels and an ambient temperature of the display panel; determining an actual temperature of the display panel according to the initial display parameters of the plurality of display pixels and the ambient temperature of the display panel; determining a compensation gamma table of the display panel according to the actual temperature of the display panel; and providing compensation data signals to the plurality of the display pixels according to the compensation gamma table.

Another aspect of the present disclosure provides a display device. The display device includes a display panel including a plurality of display pixels arranged in rows and columns; an image decoding module, configured for acquiring initial display parameters of the plurality of display pixels; a temperature acquisition module, configured for acquiring the ambient temperature of the display panel; an integrated processing module, configured for determining an actual temperature of the display panel based on the initial display parameters of the plurality of display pixels and the ambient temperature of the display panel; and a display driver module, configured for determining a compensation gamma table of the display panel according to the actual temperature of the display panel, and providing compensation data signals to the plurality of display pixels according to the compensation gamma table of the display panel.

Other aspects of the present disclosure can be understood by a person skilled in the art in light of the description, the claims, and the drawings of the present disclosure.

BRIEF DESCRIPTION OF THE DRAWINGS

Accompanying drawings, which are incorporated in and constitute a part of the specification, illustrate embodiments of the present disclosure and, together with the description, serve to explain principles of the present disclosure.

To more clearly explain the embodiments of the present disclosure or the technical solutions in the prior art, the accompanying drawings needed to be used in the description of the embodiments or the prior art will be briefly described below. Obviously, for a person skilled in the art, other drawings can be acquired according to the accompanying drawings without any creative efforts.

DETAILED DESCRIPTION

To more clearly understand the above objects, features and advantages of the embodiments of the present disclosure, solutions of the embodiments of the present disclosure will be further described below. It should be noted that, if there is no conflict, the embodiments of the present disclosure and the features in the embodiments can be combined with each other.

The following description sets forth numerous specific details to facilitate a thorough understanding of the embodiments. However, the embodiments of the present disclosure can also be implemented in ways different from those described herein. Obviously, the embodiments described herein are only a part of the embodiments of the present disclosure, not all the embodiments.

Figure 1:
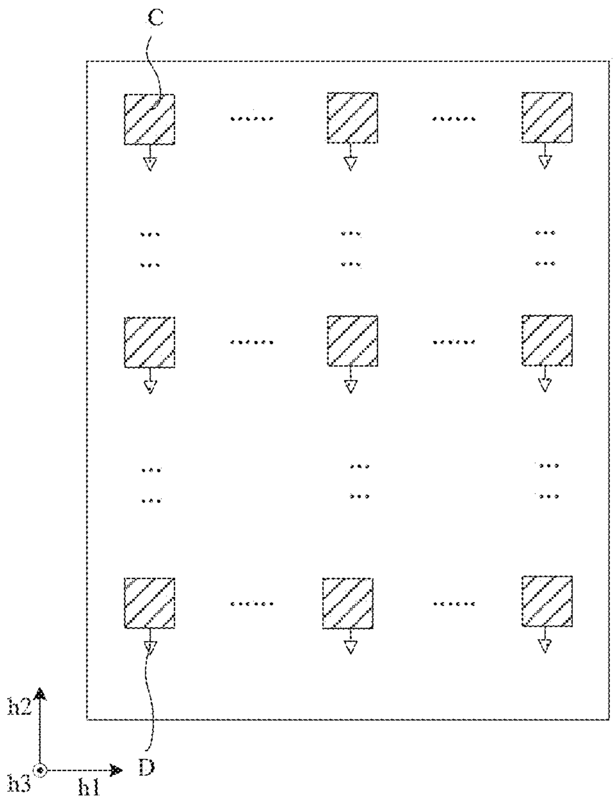
FIG. 1 illustrates a planar view of a display panel consistent with various embodiments of the present disclosure.

In one embodiment, as shown in FIG. 1, a display panel includes a plurality of pixel driving circuits C and display pixels D arranged in rows and columns. Each pixel driving circuit C is electrically connected to a display pixel D in a one-to-one correspondence. Specifically, when displaying an image, the display panel acquires a grayscale value of each display pixel, ranging from 0 to 255. A display driver module provides a data signal to a pixel driving circuit C corresponding to each display pixel D according to the grayscale value of each display pixel, so that the pixel driving circuit C drives the display pixel D to emit light according to target display parameters, thereby completing an image display.

It can be understood that FIG. 1 is only exemplary and illustrates positions of the display pixels D and connections of the display pixel D to the pixel driving circuit C in the display panel. In an actual display panel, the pixel driving circuit C is in a lower layer beneath the display pixel D and is covered by the display pixel D. A same arrangement applies to the accompanying drawings of other embodiments, which will not be repeated herein.

A gamma table is created and stored when the display panel performs gamma debugging, mapping each grayscale value from 0 to 255 to a corresponding data signal. The data signal can be a data voltage provided to the pixel driving circuit C. Specifically, a gamma curve describes a nonlinear relationship between an output brightness and an input grayscale value of the display panel during gamma debugging. A goal of gamma debugging is to adjust the relationship between the input grayscale value and the output brightness of the display panel to match a desired gamma curve.

Depending on display requirements and display panel models, the industry uses a plurality of common gamma curves, including a gamma 2.2 curve. In the gamma 2.2 curve, each time an input signal (grayscale value or voltage value) doubles, the output brightness increases exponentially to a power of 2.2 relative to an original brightness.

Figure 2:
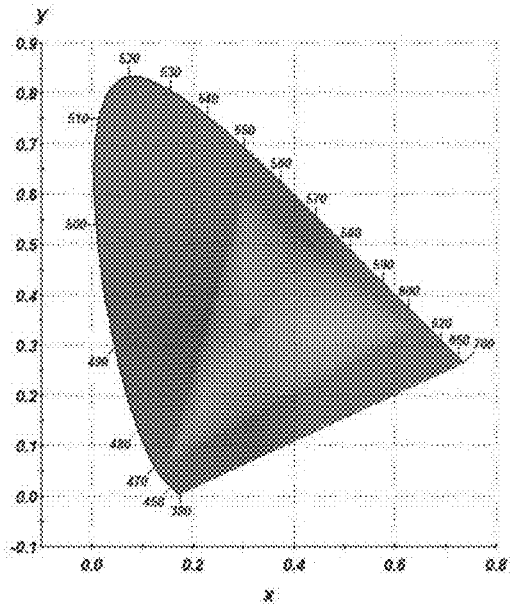
FIG. 2 illustrates a chromaticity diagram consistent with various embodiments of the present disclosure.

FIG. 2 illustrates a chromaticity diagram consistent with various embodiments of the present disclosure. The color chromaticity diagram includes all the colors that the display panel can display. Specifically, an upper left part of the chromaticity diagram is green, a lower left part is blue, a lower right part is red, and the remaining areas are transition colors between red, green, and blue. A coordinate system can be established on the chromaticity diagram, with a horizontal axis as X and a vertical axis as Y. Each color on the chromaticity diagram can be represented by XY coordinates, that is, color coordinates. For display panels, a white color coordinate is one of parameters for measuring a display effect. An inappropriate gamma curve can cause the white color coordinate of the display panel to shift, leading to color casts in the overall image.

In a specific embodiment, the display panel is a micro light-emitting diode (Micro LED) display panel. Compared to liquid crystal display (LCD) panels and organic light-emitting diode (OLED) display panels, Micro-LED display panels have advantages such as high brightness, a wide color gamut, and a long lifespan.

Factors affecting the color coordinates of a Micro-LED display panel include temperature. When a temperature rises, a light efficiency of a display pixel decreases. However, since materials and luminous frequencies of display pixels vary by color, light efficiencies of display pixels in different colors attenuate at different rates as the temperature rises, leading to color shift in the Micro-LED display panel.

To compensate for the color coordinates of the Micro-LED display panel, a data voltage of the display pixels at a same grayscale value can be increased correspondingly, thereby improving the light efficiency. However, a higher data voltage will cause the pixel drive circuit to heat up, exacerbating the color shift of the Micro-LED display panel and ultimately leading to insufficient compensation of color coordinates.

Figure 3:
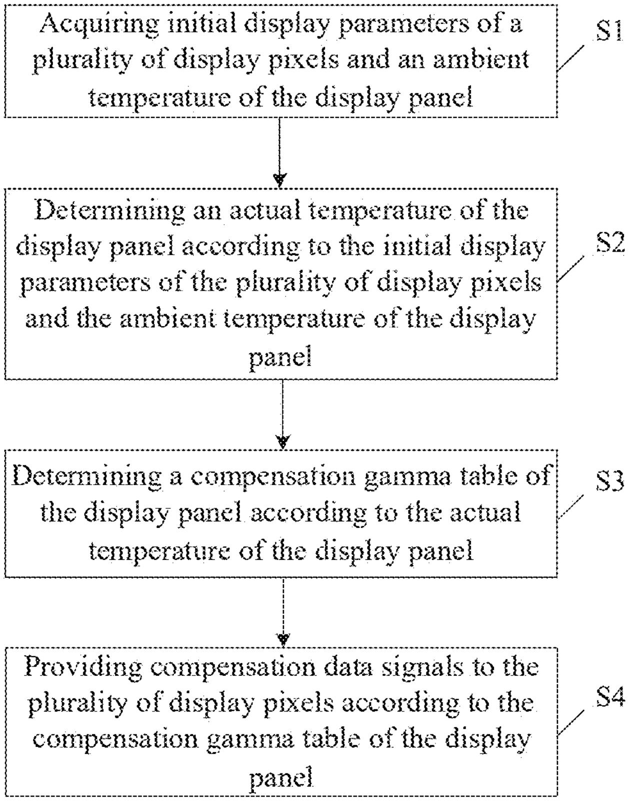
FIG. 3 illustrates a flow chart of a color shift compensation method of a display panel consistent with various embodiments of the present disclosure.

In view of the above, a color shift compensation method for a display panel is provided in one embodiment. As shown in FIG. 1, the display panel includes a plurality of display pixels D arranged in rows and columns. As shown in FIG. 3, the method includes the following steps.

S1: acquiring initial display parameters of a plurality of display pixels and an ambient temperature of the display panel.

In a specific implementation, a temperature sensor for detecting the ambient temperature may be arranged inside the display panel or in a nearby area outside the display panel. Specifically, the initial display parameters may include a plurality of display pixels intended to display grayscale values of at least one future image.

S2: determining an actual temperature of the display panel according to the initial display parameters of the plurality of display pixels and the ambient temperature of the display panel.

It can be understood that the actual temperature refers to a temperature of the display panel when displaying a predicted image according to the initial display parameters of the plurality of display pixels and a current ambient temperature of the display panel. In a specific embodiment, an average grayscale value of an image displayed by the display panel during period A is greater than an average grayscale value of the image displayed by the display panel during period B, which means that, the display panel may consume more power when displaying images during period A. At a same ambient temperature, the actual temperature of the display panel during period A will be higher than the actual temperature of the display panel during period B.

S3: determining a compensation gamma table of the display panel according to the actual temperature of the display panel.

Specifically, the display driver module stores a plurality of correspondences between temperatures and the compensation gamma table. The correspondences are acquired by gamma adjustment based on the same target at different temperatures before the display panel leaves the factory. The compensation gamma table corresponding to each temperature can enable the display panel to present a best display effect at each temperature.

S4: providing compensation data signals to the plurality of display pixels according to the compensation gamma table of the display panel.

A compensation data signal corresponding to each grayscale value from 0 to 255 is stored in the compensation gamma table. After acquiring a grayscale value of a display pixel, the display panel calla a compensation data signal corresponding to the grayscale value and provide the compensation data signal to the corresponding display pixel, thereby completing the image display.

The method provided by the embodiments of the present disclosure further predicts the actual temperature of the display panel by combining the display parameters and the ambient temperature, enabling more accurate color shift compensation on the display panel. Therefore, the display panel can receive sufficient color shift compensation when displaying different images, thereby improving the display effect.

In some embodiments, the above S1 includes acquiring initial display parameters of each display pixel of the display panel and the ambient temperature of the display panel in a preset display area.

The above S2 includes determining an average power consumption density of the display panel in the preset display area based on the initial display parameters of a display pixel of the display panel in the preset display area, an area of the preset display area, and a validity time of the initial display parameters of the display pixel of the display panel in the preset display area. An actual temperature of the display panel in the preset display area is determined based on the average power consumption density of the display panel in the preset display area and the ambient temperature of the display panel in the preset display area.

The temperature of the display panel is related to power consumption density thereof when displaying an image. In a specific embodiment, the average power consumption density of the image displayed by the display panel during period A is higher than the average power consumption density of the image displayed by the display panel during period B. At a same ambient temperature, the actual temperature of the display panel during period A will be higher than the actual temperature of the display panel during period B, which requires additional color shift compensation for the display panel during period A.

In a specific implementation, the preset display area may be an entire display area or a partial display area of the display panel. One embodiment of dividing the entire display area of the display panel into a plurality of subareas will be further described in the following embodiments.

Specifically, the following formula determines the average power consumption density of the display panel in the preset display area.

$$W \propto \frac{\int_{y_1}^{y_2}\int_{x_1}^{x_2}\int_{t_1}^{t_2} Lv\, dt}{\Delta t \cdot S}$$

W represents the average consumption density, x and y denote a position of the display pixel in the display panel, Lv is the grayscale value in the initial display parameters of the display pixel, S is the area of the preset display area, t2-t1 is the validity time of initial display parameters (i.e., a duration of the image displayed with the initial display parameters) of the display pixel of the display panel in the preset display area. By integrating the grayscale values for a specific area of the display panel over a subsequent display time Δt, the power consumption density in the specific area during a subsequent period can be acquired.

Specifically, the above calculation can be performed by the display driver module or can also be performed by an additional field programmable gate array (FPGA).

In some embodiments, the display driver module stores a plurality of correspondences between temperatures and the compensation gamma table. The above S3 includes directly accessing and determining the compensation gamma table corresponding to the actual temperature without real-time calculation according to the actual temperature and the correspondences stored in a driver chip.

Specifically, the correspondences are acquired by gamma adjustment based on a same target at different temperatures before the display panel leaves the factory. The compensation gamma table corresponding to each temperature can enable the display panel to present a best display effect at each temperature.

In some embodiments, the above method further includes executing S1 to S4 in response to updates to the initial display parameters for at least part of the display pixels.

Figure 4:
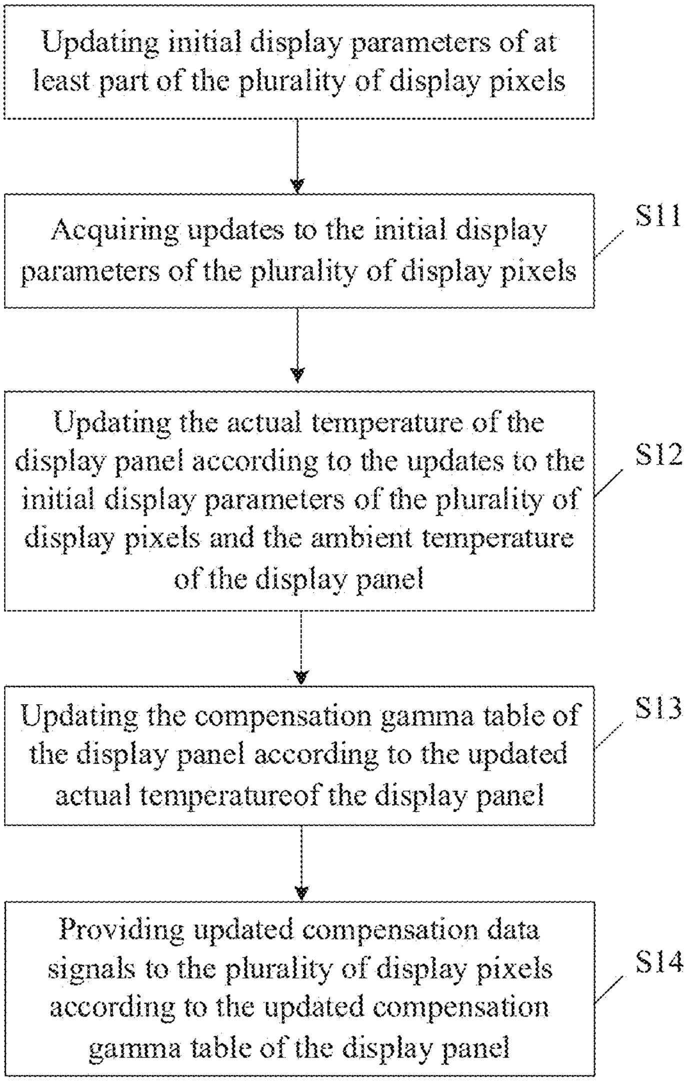
FIG. 4 illustrates a flow chart of a color shift compensation method of another display panel consistent with various embodiments of the present disclosure.

In a specific embodiment, as shown in FIG. 4, the above method further includes executing the following steps in response to the updates to the initial display parameters for at least part of the display pixels.

S11: acquiring updates to the initial display parameters of the plurality of display pixels.

S12: updating the actual temperature of the display panel according to the updates to the initial display parameters of a plurality of display pixels and the ambient temperature of the display panel.

S13: updating the compensation gamma table of the display panel according to the updated actual temperature of the display panel.

S14: providing updated compensation data signals to the plurality of display pixels according to the updated compensation gamma table of the display panel.

During most of the display time, the display panel screen requires constant refreshing, which updates the initial display parameters. However, in some special cases, such as when the display panel shows standby screen, the initial display parameters may not be updated for a long period. During the period, impacts of the initial display parameters on the display panel temperature are same, so there is no need to recalculate, thereby saving computing resources.

In some embodiments, after S1 and before S2, the above method includes continuing to execute S2 if the ambient temperature exceeds a high temperature threshold, If the ambient temperature of the display panel is low, such as outdoors in winter, the initial display parameters will have a reduced impact on both the temperature of the display panel and the display effect. The above embodiments are only used when the ambient temperature is high, which can save computing resources.

Specifically, the high temperature threshold may be 32°. A person skilled in the art can also set the above high temperature threshold according to the future working environment and display effect requirements of the display panel, which is not limited herein.

In some embodiments, the acquiring the ambient temperature of the display panel in S1 includes acquiring the ambient temperature of the display panel at set intervals.

In a specific implementation, a change rate of the ambient temperature is low. When the display panel is used in a fixed environment, the ambient temperature remains stable for a long period. To save computing resources, the ambient temperature can be acquired at intervals and perform S2 to S4 in the above embodiments.

In some embodiments, the set interval ranges from 1 to 10 minutes.

In some embodiments, the above method further includes the following steps.

S5: acquiring actual luminescence data of the display pixels after the display pixel emits light according to the compensation data signals.

Specifically, the actual luminescence data refers to actual luminescence data of the display panel acquired externally. External methods for acquiring actual brightness can be categorized as optical and electrical acquisition methods. The optical acquisition method refers to capturing a brightness signal using optical CCD photography after illuminating the display panel. The electrical acquisition method refers to acquiring electrical signals from the transistors and display pixels through a sensing circuit of the display driver module.

S6: providing secondary compensation data signals to at least part of display pixels based on the actual luminescence data.

After color deviation compensation is performed on the display panel using steps S1 to S4, the display panel may still exhibit uneven display issues and additional compensation can be applied based on the actual brightness of the display panel.

Specifically, the Demura algorithm can be used in S6 to provide secondary compensation data signals to at least part of display pixels based on the actual luminescence data.

Figure 5:
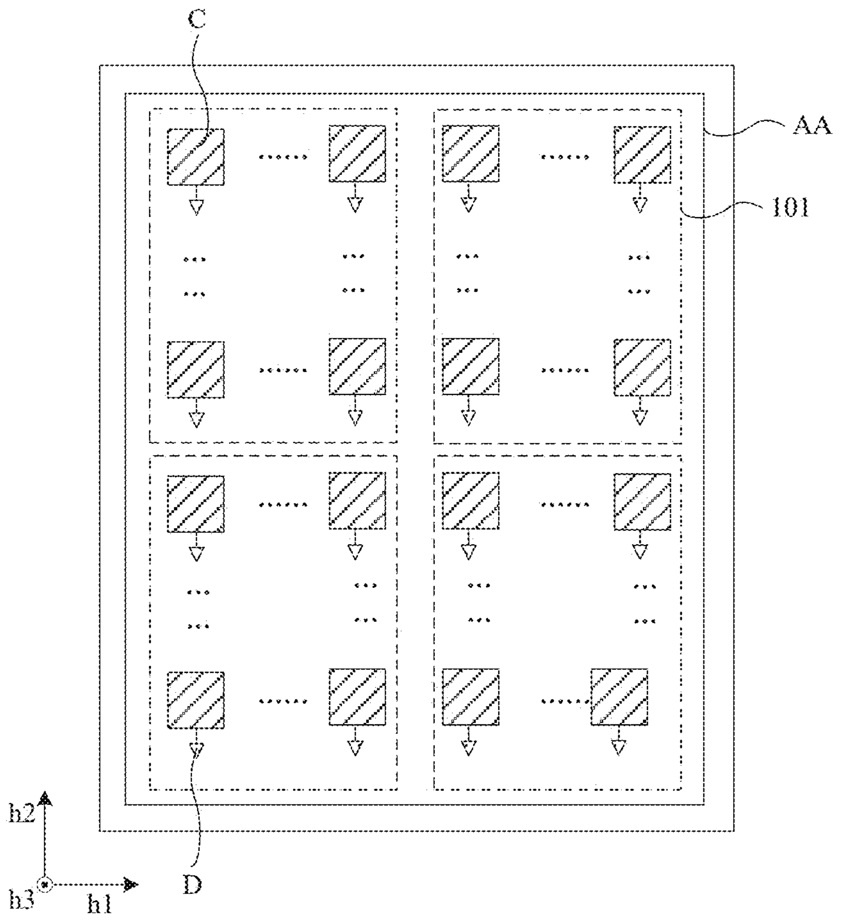
FIG. 5 illustrates a planar view of another display panel consistent with various embodiments of the present disclosure.

In some embodiments, as shown in FIG. 5, the display panel includes a display area AA including at least two subareas 101, and each subarea 101 includes a plurality of display pixels D.

Figure 6:
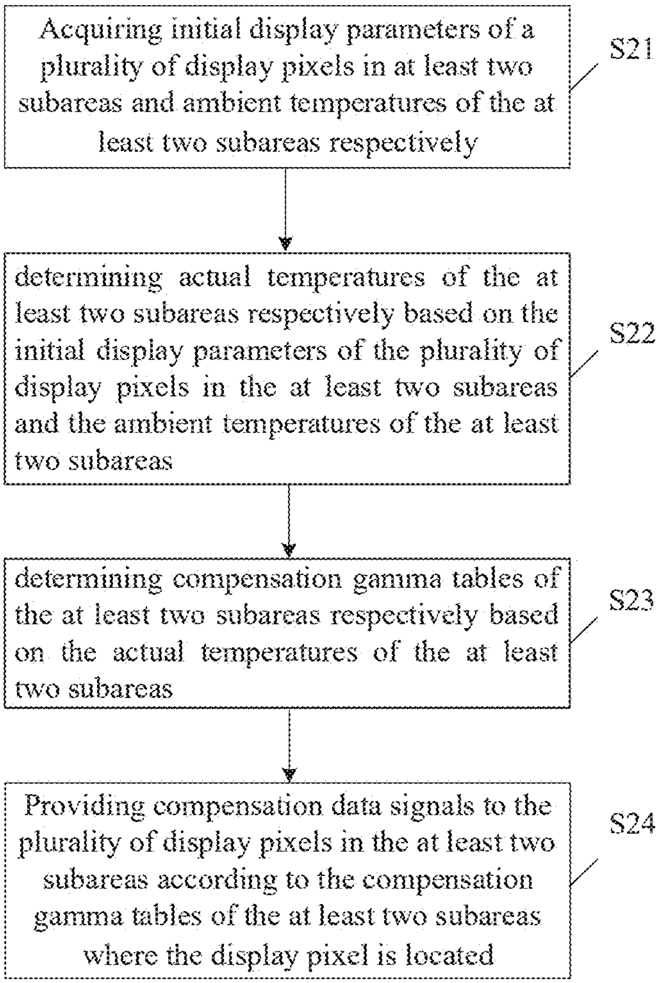
FIG. 6 illustrates a flow chart of a color shift compensation method of another display panel consistent with various embodiments of the present disclosure.

As shown in FIG. 6, the above S1 includes the following step.

S21: acquiring initial display parameters of a plurality of display pixels in at least two subareas and ambient temperatures of the at least two subareas respectively.

In a specific implementation, temperature sensors for detecting the ambient temperature of each subarea may be arranged in different adjacent areas inside or outside the display panel. Specifically, the initial display parameters may include grayscale values of the plurality of display pixels in each subarea used to display at least one future image.

The S2 includes the following step.

S22: determining actual temperatures of the at least two subareas respectively based on the initial display parameters of the plurality of display pixels in the at least two subareas and the ambient temperatures of the at least two subareas.

The S3 includes the following step.

S23: determining compensation gamma tables of the at least two subareas respectively based on the actual temperatures of the at least two subareas respectively.

It can be understood that since the actual temperatures of the two subareas are typically different, the compensation gamma tables corresponding to the two subareas will also differ in most cases, which however does not exclude the possibility that, in some special cases, the compensation gamma tables for the two subareas may be same. Specifically, the compensation gamma table includes a plurality of grayscale values and compensation data signals for each grayscale value. At least part of the grayscale values in different compensation gamma tables correspond to different compensation data signals.

The S4 includes the following step.

S24: providing compensation data signals to the plurality of display pixels in the at least two subareas according to a compensation gamma table of the at least two subareas where the display pixel is located.

In larger display panels, ambient temperatures may vary across different areas. Additionally, since the images displayed in each subarea differ, the actual temperatures in different parts of the display panel may also vary. Targeted color shift compensation for different areas of the display panel can further enhance an overall display effect of the display panel.

A specific process of performing gamma compensation on each subarea of the display panel can be referenced from the above embodiment that describes gamma compensation for the entire display area, which is not repeated herein.

Figure 7:
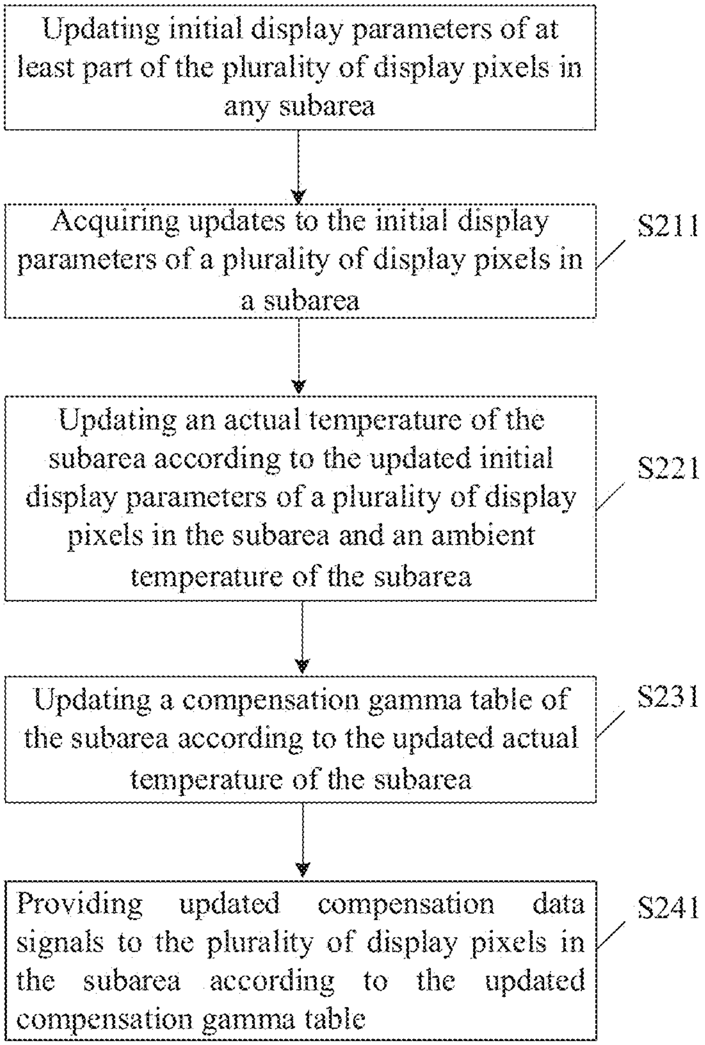
FIG. 7 illustrates a flow chart of a color shift compensation method of another display panel consistent with various embodiments of the present disclosure.

In some embodiments, as shown in FIG. 7, the above method further includes executing the following steps in response to the updates to the initial display parameters for at least part of the display pixels in any subarea.

S211: acquiring updates to the initial display parameters of a plurality of display pixels in a subarea.

S221: updating an actual temperature of the subarea according to the updated initial display parameters of a plurality of display pixels in the subarea and an ambient temperature of the subarea.

S231: updating a compensation gamma table of the subarea according to the updated actual temperature of the subarea.

S241: providing updated compensation data signals to the plurality of display pixels in the subarea according to the updated compensation gamma table.

During most of the display time, the display panel screen requires constant refreshing, which updates the initial display parameters. However, in some special cases, such as when the display panel shows standby screen, the initial display parameters may not be updated for a long period. During the period, impacts of the initial display parameters on the display panel temperature are same, so there is no need to recalculate, thereby saving computing resources.

In some embodiments, the initial display parameters include grayscale values of a plurality of display pixels. If the grayscale values of two display pixels are same, the two display pixels are expected to exhibit the same brightness and color. The above method further includes, when at least two adjacent display pixels of a same color with the same grayscale value are found in subareas with different compensation gamma tables, adjusting compensation data signals provided to at least part of display pixels of a same color. The adjustment ensures that a difference in brightness between the compensation data signals of any two adjacent display pixels of a same color is within a preset value. The compensation gamma table includes a plurality of grayscale values and corresponding compensation data signals thereof. The compensation data signals corresponding to at least part of the grayscale values in different compensation gamma tables are different.

Figure 8:
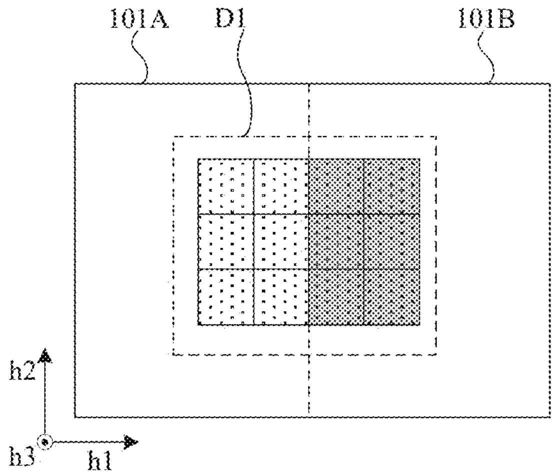
FIG. 8 illustrates a partial planar view of a display panel consistent with various embodiments of the present disclosure.

FIG. 8 illustrates a plurality of adjacent display pixels D1 of a same color with a same grayscale value in the first subarea 101A and the second subarea 101B. Compensation gamma tables of the first subarea 101A and the second subarea 101B are different, which leads to different brightness values in the plurality of display pixels D1 of the same color, resulting in visual screen splitting. By adjusting the compensation data signal provided to at least part of the display pixels D1 of the same color, the final display effect of the display pixels D1 of the same color in different subareas can be uniformized, thereby avoiding visual screen splitting.

In some embodiments, the adjusting the compensation data signals is provided to at least part of the display pixels of a same color in response to a presence of at least two adjacent display pixels of a same color with a same grayscale value in subareas with different compensation gamma tables. The adjustment ensures that the difference in brightness between the compensation data signals of any two adjacent display pixels of a same color is within the preset value. As at least two adjacent display pixels of a same color with a same grayscale value in subareas with different compensation gamma tables, and the maximum difference value of the compensation data signals in the at least two adjacent display pixels of the same color is X, the adjustment specifically includes: compensating two display pixels of the same color with a compensation data signal difference of X that are separated by at most Y display pixels of the same color in a first direction, adjusting the compensation data signals for at least part of display pixels of the same color so that the compensation data signals corresponding to two adjacent display pixels of the same color in a second direction are identical, and ensuring that the difference between the compensation data signals corresponding to two adjacent display pixels of the same color in the first direction is X/(Y+1), thereby achieving the display effect of brightness and color gradient of at least two display pixels of the same color. The first direction intersects with the second direction, and Y is a positive integer.

Figure 9:
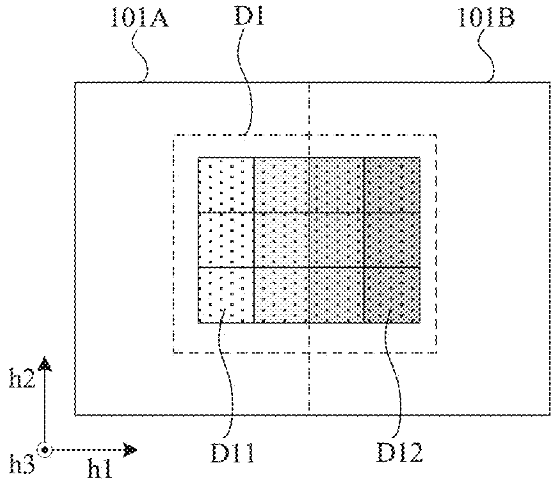
FIG. 9 illustrates a partial planar view of another display panel consistent with various embodiments of the present disclosure.

FIG. 9 illustrates a plurality of adjacent display pixels D1 of a same color with a same grayscale value in a first subarea 101A and a second subarea 101B. A difference between the compensation data signals of a first display pixel D11 of the same color and a second display pixel D12 of the same color is the largest with a maximum difference of X. The first display pixel D11 of the same color and the second display pixel D12 of the same color are separated by at most two display pixels of the same color, so that the compensation data signals corresponding to two adjacent display pixels D1 of the same color in a second direction h2 are identical. After the difference between the compensation data signals corresponding to the two adjacent display pixels D1 of the same color in a first direction h1 is reduced to X/3, in the first direction h1, the compensation data signals of two adjacent display pixels D1 of the same color change in a stepwise manner, thereby achieving a gradient effect shown in FIG. 9.

It should be noted that the method described in the embodiments of the present disclosure can be executed by a single device, such as a computer or server. The method can also be applied in a distributed scenario and is completed by a plurality of devices cooperating with each other. In the distributed scenario, one of the plurality of devices may only perform one or more steps in the method, and the plurality of devices may interact with each other to complete the method.

It should be noted that while some embodiments of the present disclosure have been described above, other embodiments are within the scope of the appended claims. In some cases, actions or steps recited in the claims can be performed in an order different from actions or steps described in the above embodiments and still achieve desired results. Additionally, processes depicted in the accompanying drawings do not necessarily require a specific order shown, or sequential order, to achieve desirable results. Multitasking and parallel processing may also be possible or advantageous in certain implementations.

Figure 10:
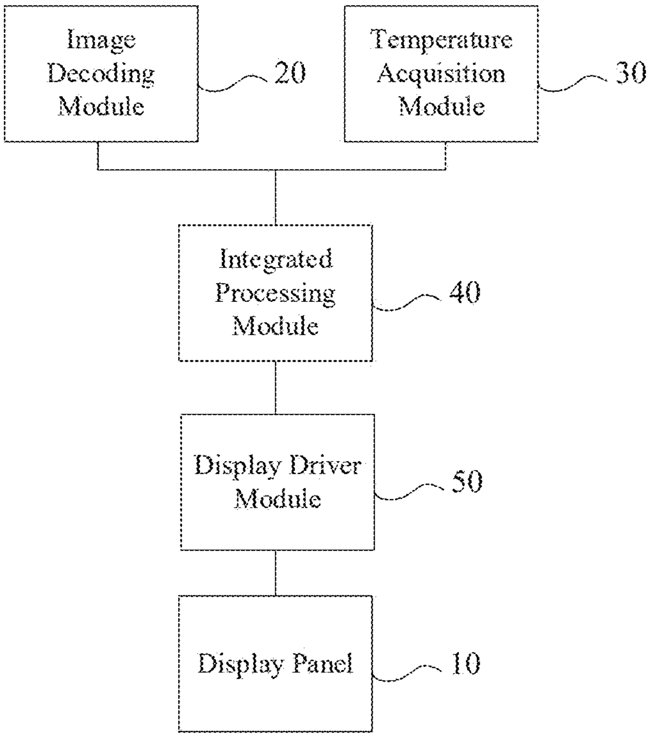
FIG. 10 illustrates a schematic diagram of a display device consistent with various embodiments of the present disclosure.

Based on a same inventive concept as described in any of the above embodiments, the present disclosure also provides a display device, as illustrated in FIG. 10. The display device includes a display panel 10 including a plurality of display pixels arranged in rows and columns, an image decoding module 20, configured for acquiring initial display parameters of a plurality of display pixels, a temperature acquisition module 30, configured for acquiring an ambient temperature of the display panel, an integrated processing module 40, configured for determining an actual temperature of the display panel based on the initial display parameters and the ambient temperature, and sending the actual temperature to a display driver module 50 described below. The integrated processing module includes 2828 registers.

The image decoding module 20 may include a field programmable gate array (FPGA) module. The FPGA module is configured for acquiring the initial display parameters (i.e., grayscale values) of the display pixels and the validity time of the initial display parameters and sending the initial display parameters and the validity time to the integrated processing module 40. In other embodiments, the image decoding module 20 may include an FPGA module and a time reading module. The FPGA module is configured for acquiring the initial display parameters of the display pixels and sending the initial display parameters to the integrated processing module 40. The time reading module is configured for acquiring the validity time of the initial display parameters and sending the validity time to the integrated processing module 40.

The temperature acquisition module 30 includes a temperature sensor arranged inside the display panel or in an adjacent area outside the display panel. In some embodiments, ambient temperature data collected by the temperature sensor is an analog signal. The temperature acquisition module 30 may also include a digital-to-analog converter. The digital-to-analog converter is configured for converting the analog signal into a digital signal and sending the digital signal to the integrated processing module 40.

The display driver module 50 is configured for determining a compensation gamma table of the display panel according to the actual temperature and providing compensation data signals for a plurality of display pixels according to the compensation gamma table. Specifically, the display driver module 50 stores a plurality of correspondences between temperatures and compensation gamma tables. The plurality of correspondences is acquired by performing gamma adjustment based on a same target at different temperatures before the display panel leaves the factory. The compensation gamma table corresponding to each temperature enables the display panel to present the best display effect at each temperature.

A compensation data signal corresponding to each grayscale value from 0 to 255 is stored in the compensation gamma table. After acquiring a grayscale value of each display pixel, the display driver module 50 retrieves the compensation data signal corresponding to the grayscale value and provides the compensation data signal to the corresponding display pixel, thereby completing the image display.

The display driver module 50 may be a driver chip connected to the display panel 10. In related technologies, the driver chip is part of the display panel. In the above case, the display panel 10 in one embodiment can be considered as a display panel including display pixels and pixel driving circuits.

In one embodiment, the display device further predicts the actual temperature of the display panel by combining display parameters and the ambient temperature and can perform more accurate color shift compensation on the display panel, so that display panel can receive sufficient color shift compensation when displaying different images, thereby enhancing the display effect.

Figure 11:
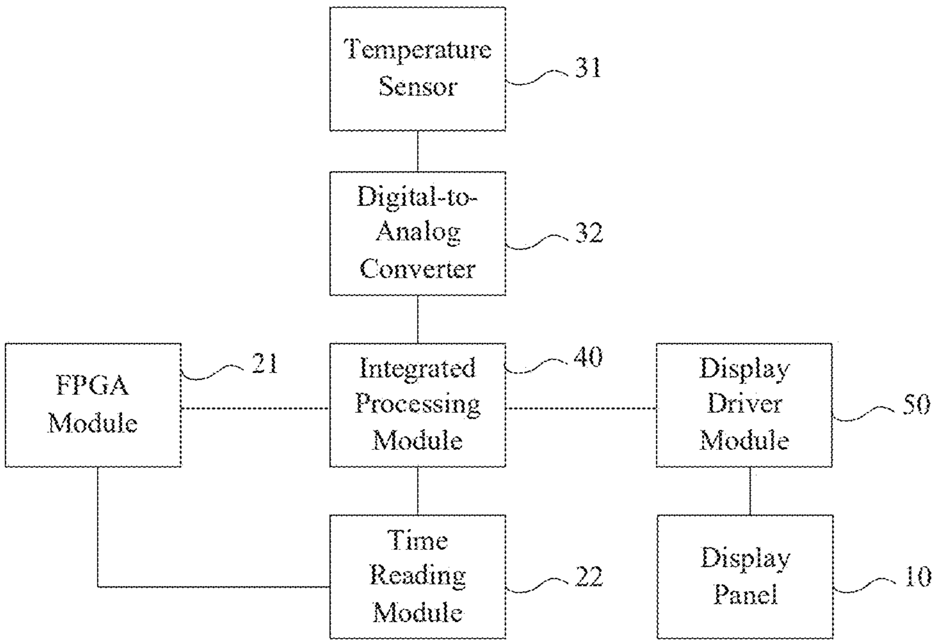
FIG. 11 illustrates a schematic diagram of another display device consistent with various embodiments of the present disclosure.

In a specific embodiment, as shown in FIG. 11, the display device includes a display panel 10 includes a plurality of display pixels arranged in rows and columns; an FPGA module 21, configured for acquiring initial display parameters of display pixels, and controlling a time reading module 22 to acquire a validity time of the initial display parameters of the display pixels; the time reading module 22, configured for acquiring the validity time of the initial display parameters of the display pixels; a temperature sensor 31, configured for acquiring an ambient temperature of the display panel; a digital-to-analog converter 32, configured for converting analog signals into digital signals; an integrated processing module 40, configured for determining an actual temperature of the display panel according to the initial display parameters and the ambient temperature; and a display driver module 50, configured for determining a compensation gamma table of the display panel according to the actual temperature, and providing compensation data signals for a plurality of display pixels according to the compensation gamma table.

Figure 12:
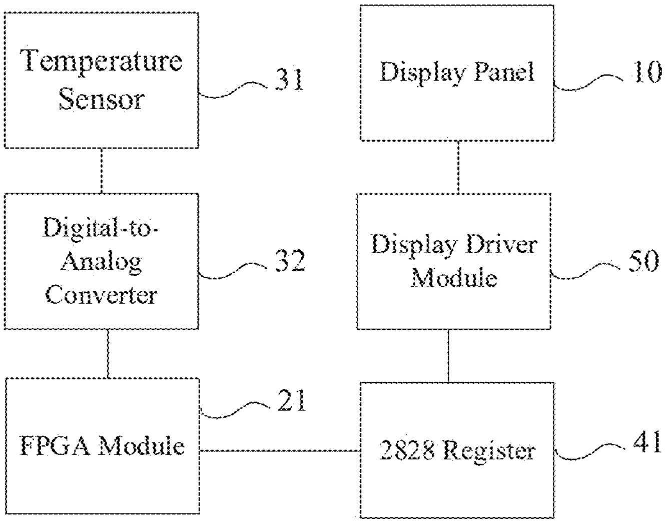
FIG. 12 illustrates a schematic diagram of another display device consistent with various embodiments of the present disclosure.

In another specific embodiment, as shown in FIG. 12, the display device includes a display panel 10 includes a plurality of display pixels arranged in rows and columns; an FPGA module 21, configured for acquiring initial display parameters of the display pixels, and controlling a time reading module 22 to acquire a validity time of the initial display parameters of the display pixels; the time reading module 22, configured for acquiring the validity time of the initial display parameters of the display pixels; a temperature sensor 31, configured for acquiring an ambient temperature of the display panel; a digital-to-analog converter 32, configured for converting analog signals into digital signals; 2828 registers 41, configured for determining an actual temperature of the display panel based on the initial display parameters and the ambient temperature; and a display driver module 50, configured for determining a compensation gamma table of the display panel according to the actual temperature, and providing compensation data signals for a plurality of display pixels according to the compensation gamma table.

In some embodiments, the image decoding module 20 and the temperature acquisition module 30 are specifically configured for acquiring the initial display parameters of each display pixel of the display panel in a preset display area, the validity time of the initial display parameters, and the ambient temperature of the display panel in the preset display area.

The integrated processing module 40 is specifically configured for determining an average power consumption density of the display panel in the preset display area based on the initial display parameters of each display pixel of the display panel in the preset display area, an area of the preset display area, and the validity time of the initial display parameters. The actual temperature of the display panel in the preset display area is determined based on the average power consumption density of the display panel in the preset display area and the ambient temperature corresponding to the preset display area.

In a specific embodiment, the image decoding module 20 is further configured for acquiring the updated initial display parameters of a plurality of display pixels in response to updates to the initial display parameters of at least part of the display pixels.

The integrated processing module 40 is further configured for updating the actual temperature of the display panel according to the updated initial display parameters and the ambient temperature.

The display driver module 50 is further configured for updating the compensation gamma table of the display panel according to the updated actual temperature and providing updated compensation data signals to a plurality of display pixels according to the updated compensation gamma table.

In some embodiments, the temperature acquisition module 30 is further configured for acquiring the ambient temperature of the display panel at set intervals.

In some embodiments, a set interval of the set intervals ranges from 1 to 10 minutes.

In some embodiments, the display driver module 50 is further configured for acquiring actual illumination data of the display pixel after the display pixel emits light according to the compensation data signal and providing secondary compensation data signals to at least part of the display pixels according to the actual illumination data.

In some embodiments, as shown in FIG. 5, the display area AA of the display panel includes at least two subareas 101, each containing a plurality of display pixels D.

The image decoding module 20 and the temperature acquisition module 30 are specifically configured for acquiring initial display parameters of a plurality of display pixels in at least two subareas and ambient temperatures of the at least two subareas.

The integrated processing module 40 is specifically configured for determining actual temperatures of at least two subareas based on initial display parameters of a plurality of display pixels in at least two subareas and ambient temperatures of the at least two subareas.

the display driver module 50 is specifically configured for respectively determining compensation gamma tables of at least two subareas according to actual temperatures of the at least two subareas, and providing compensation data signals to display pixels according to the compensation gamma tables of the subareas where the display pixels are located.

In some embodiments, the image decoding module 20 is further configured for acquiring updated initial display parameters of a plurality of display pixels in a subarea in response to the updated initial display parameter of at least part of the display pixels in the subarea.

The integrated processing module 40 is further configured for updating the actual temperature of the subarea according to the updated initial display parameters and the ambient temperature.

The display driver module 50 is further configured for updating the compensation gamma table of the subarea according to the updated actual temperature and providing updated compensation data signals to a plurality of display pixels in the subarea according to the updated compensation gamma table.

In some embodiments, the initial display parameters include grayscale values corresponding to a plurality of display pixels. Same grayscale values of two display pixels indicate that the two display pixels are expected to exhibit a same brightness and color. The display driver module 50 is further configured for adjusting compensation data signals provided to at least part of the plurality of display pixels of a same color when at least two adjacent display pixels of the same color with a same grayscale value are in subareas with different compensation gamma tables so that a difference between the compensation data signals of every two adjacent display pixels of the same color is within a preset value.

In some embodiments, the display driver module 50 is specifically configured for adjusting compensation data signals provided to at least part of the display pixels of the same color, in response to a presence of at least two adjacent display pixels of a same color with a same grayscale value being located in subareas with different compensation gamma tables, and a maximum difference of compensation data signals in at least two display pixels of the same color being X, two display pixels of the same color with a difference value of X between the compensation data signals being separated by at most Y display pixels of the same color in a first direction, so that the compensation data signals corresponding to two adjacent display pixels of the same color in a second direction are identical, and the difference between the compensation data signals corresponding to two adjacent display pixels of the same color in the first direction is X/(Y+1), thereby realizing a display effect of brightness and color gradient of at least two display pixels of the same color. The first direction h1 intersects the second direction h2, and Y is a positive integer.

Figure 13:
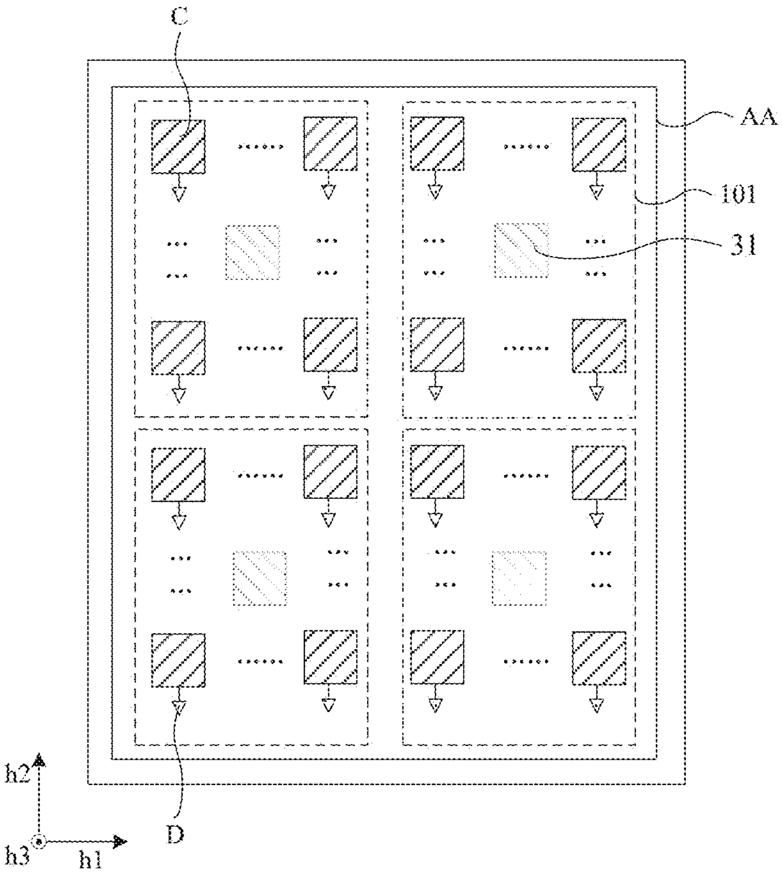
FIG. 13 illustrates a planar view of a display device consistent with various embodiments of the present disclosure.

In some embodiments, as shown in FIG. 13, the temperature acquisition module 30 includes at least two temperature sensors 31. The temperature sensors 31 correspond one-to-one with the subareas 101 of the display panel and are configured for acquiring ambient temperatures of the corresponding subareas 101.

FIG. 13 illustrates a conventional non-transparent display panel, and the temperature sensors 31 can be directly arranged on a back of the display panel at positions corresponding to subareas.

Figure 14:
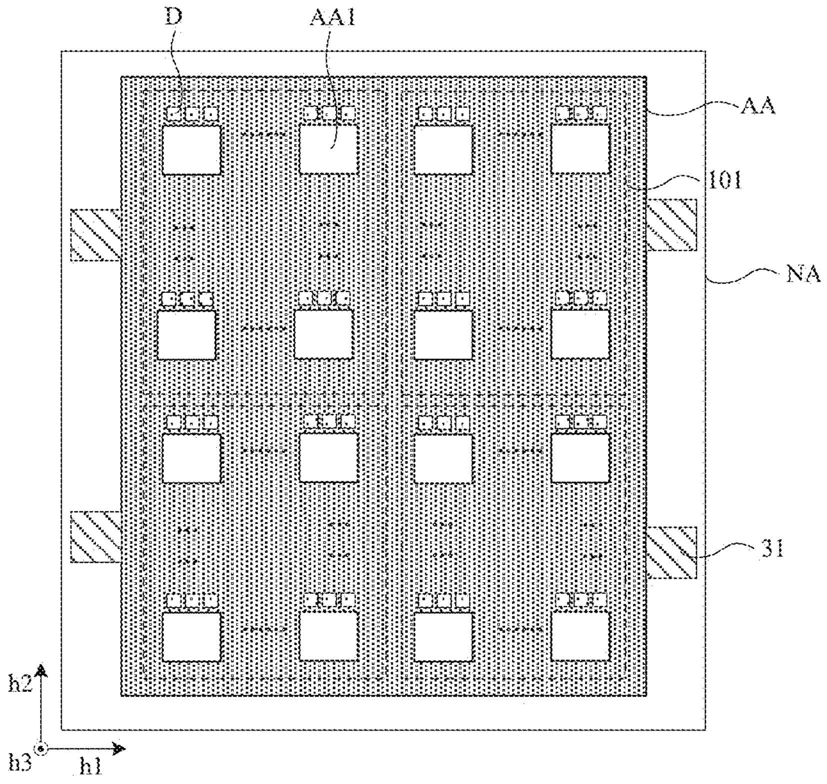
FIG. 14 illustrates a planar view of another display device consistent with various embodiments of the present disclosure.

In some embodiments, as shown in FIG. 14, the display panel includes a display area AA and a non-display area NA. A plurality of display pixels D arranged in rows and columns are in the display area AA, and the non-display area NA is on at least one side of the display area AA. The display area AA includes a light-transmitting area AA1, and temperature sensors 31 at least partially overlap the non-display area NA of the display panel in a thickness direction h3 of the display panel.

FIG. 14 shows a transparent display panel including a light-transmitting area. To prevent an arrangement of the temperature sensors 31 from affecting a transparent display effect, the temperature sensors 31 are arranged in the non-display area NA and adjacent to corresponding subareas 101 thereof.

In some embodiments, as shown in FIG. 14, each subarea 101 is adjacent to the non-display area NA, thereby ensuring that each subarea 101 can correspond to a nearby temperature sensor 31.

Figure 15:
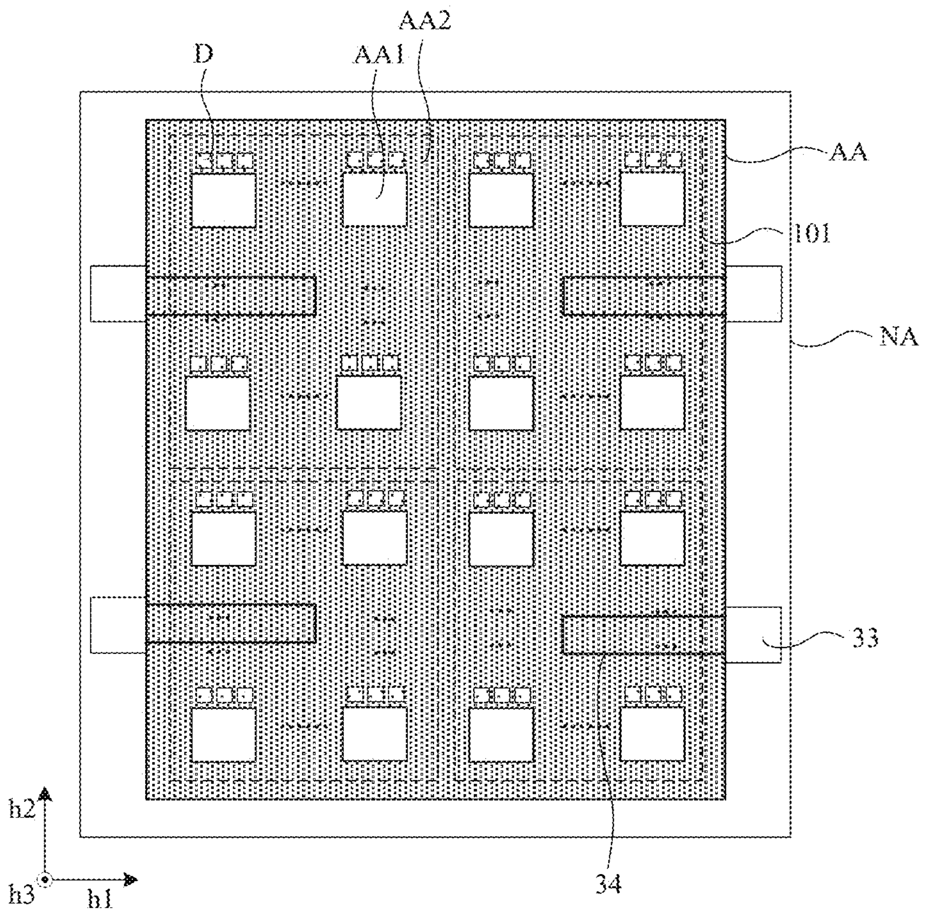
FIG. 15 illustrates a planar view of another display device consistent with various embodiments of the present disclosure.

In some embodiments, as shown in FIG. 15, the display area AA of the display panel includes light-transmitting areas AA1 and circuit areas AA2. A light transmittance of a light-transmitting area AA1 is higher than a light transmittance of a circuit area AA2. Display pixels D and pixel driving circuits (not shown) are in the circuit area AA2.

The temperature acquisition module 30 includes data processing circuits 33 and temperature measurement wirings 34. A temperature measurement wiring 34 is at least partially in the circuit area AA2, and each subarea 101 includes at least part of a temperature measurement wiring 34.

In the thickness direction h3 of the display panel, a data processing circuit 33 at least partially overlaps the non-display area NA of the display panel.

A temperature measurement wiring 34 is electrically connected to a data processing circuit 33. The data processing circuit 33 is configured for measuring a resistance value on a temperature measurement wiring 34 and acquiring an ambient temperature of a corresponding subarea 101 based on a resistance value on the temperature measurement wiring 34.

Specifically, a temperature measurement wiring 34 is made of a metal material whose resistance value can change regularly with temperature, and can be a metal material such as molybdenum, aluminum, molybdenum, titanium, aluminum, or titanium. In a specific implementation, a data processing circuit provides a constant current to the temperature measurement wiring, measures a voltage value on the temperature measurement wiring, and calculates a current resistance value of the temperature measurement wiring using the voltage value and the constant current. A corresponding relationship between a plurality of resistance values and temperatures is stored in the data processing circuit, and an ambient temperature of a corresponding subarea can be acquired based on the resistance value of the temperature measurement wiring.

In some embodiments, as shown in FIG. 15, the first direction h1 intersects the second direction h2. In the first direction h1, an extension length of a temperature measurement wiring 34 is greater than or equal to half a length of a corresponding subarea 101, so that the temperature measurement wiring 34 can detect a temperature near a center of the subarea 101 in the first direction h1. In the second direction h2, a difference in distance between the temperature measurement wiring 34 and two edges of the corresponding subarea 101 is less than or equal to half a width of the subarea 101, so that the temperature measuring wiring 34 can detect a temperature near the center of the subarea 101 in the second direction h2.

For clarity, functions of the display device are divided into various modules and described separately. When implementing the display device, functions of each module can be implemented in a same or a plurality of software and/or hardware components.

The display device described in the above embodiments is configured to implement the corresponding color shift compensation method of the display panel as outlined in any of the previous embodiments and have beneficial effects of the corresponding method embodiments, which are not repeated herein.

It should be noted that in the present specification, relational terms such as "first" and "second" are only used to distinguish one entity or operation from another entity or operation, and do not necessarily require or imply that there is any such actual relationship or order between these entities or operations. Moreover, the terms "including", "include" or any other variation thereof are intended to cover non-exclusive inclusion, so that a process, method, article or device including a series of elements includes not only those elements, but also other elements not explicitly listed or elements inherent to such process, method, article or device. Without further restrictions, an element defined by the phrase "including a" does not exclude the existence of other identical elements in the process, method, article or device including the element.

As disclosed, the color shift compensation method of a display panel and the display device provided by the present disclosure at least realize the following beneficial effects.

The method further predicts the actual temperature of the display panel by combining display parameters and ambient temperatures and can perform more accurate color shift compensation on the display panel, so that display panel can be fully compensated for color shift when displaying different images, thereby improving the display effect of the display panel.

The above are only specific embodiments of the present disclosure, so that a person skilled in the art can understand or implement the present disclosure. Many modifications to the embodiments will be obvious to a person skilled in the art, and the general principles defined herein can be implemented in other embodiments without departing from the spirit or scope of the present disclosure. Therefore, the present disclosure will not to be limited to the embodiments shown herein but is to be in conformity with a widest scope consistent with the principles and novel features disclosed herein.

What is claimed is:

1. A color shift compensation method for a display panel including a plurality of display pixels arranged in rows and columns, comprising:

acquiring initial display parameters of a plurality of display pixels and an ambient temperature of the display panel;

in response to the ambient temperature of the display panel being higher than a set temperature threshold, determining an actual temperature of the display panel according to the initial display parameters of the plurality of display pixels and the ambient temperature of the display panel;

determining a compensation gamma table of the display panel according to the actual temperature of the display panel; and providing compensation data signals to the plurality of the display pixels according to the compensation gamma table.

2. The method according to claim 1, wherein:

the acquiring the initial display parameters of the plurality of display pixels and the ambient temperature of the display panel includes:

acquiring initial display parameters of each display pixel of the display panel in a preset display area and an ambient temperature of the display panel in the preset display area; and the determining the actual temperature of the display panel according to the initial display parameters of the plurality of display pixels and the ambient temperature of the display panel includes:

determining an average power consumption density of the display panel in the preset display area according to the initial display parameters of each display pixel of the display panel in the preset display area, an area of the preset display area and a validity time of the initial display parameters of each display pixel of the display panel in the preset display area, and determining an actual temperature of the display panel in the preset display area according to the average power consumption density of the display panel in the preset display area and the ambient temperature of the display panel corresponding to the preset display area.

3. The method according to claim 1, wherein:

the display panel includes a display driver module storing a plurality of correspondences between temperatures and the compensation gamma table; and the determining the compensation gamma table of the display panel according to the actual temperature of the display panel includes determining the compensation gamma table corresponding to the actual temperature of the display panel according to the actual temperature of the display panel and the plurality of correspondences stored in a driver chip.

4. The method according to claim 1, further comprising:

acquiring updated initial display parameters of a plurality of the display pixels in response to updates to initial display parameters of at least part of the display pixels;

updating the actual temperature of the display panel according to the updated initial display parameters and the ambient temperature of the display panel; and updating the compensation gamma table of the display panel according to the updated actual temperature of the display panel and providing updated compensation data signals to the plurality of the display pixels according to the updated compensation gamma table.

5. The method according to claim 1, wherein the acquiring the ambient temperature of the display panel, includes:

acquiring the ambient temperature of the display panel at set intervals, a set interval of the set intervals ranging from 1 to 10 minutes.

6. The method according to claim 1, wherein:

the display panel includes at least two subareas, each subarea of the at least two subareas includes a plurality of display pixels;

the acquiring initial display parameters of the plurality of display pixels and an ambient temperature of the display panel includes:

acquiring initial display parameters of a plurality of display pixels in at least two subareas and ambient temperatures of the at least two subareas respectively;

the determining the compensation gamma table of the display panel according to the actual temperature of the display panel includes:

determining actual temperatures of the at least two subareas respectively according to the initial display parameters of the plurality of display pixels in the at least two subareas and the ambient temperatures of the at least two subareas; and the providing the compensation data signals to the plurality of the display pixels according to the compensation gamma table of the display panel includes:

providing the compensation data signals to the plurality of display pixels according to a compensation gamma table of the at least two subareas where the plurality of display pixels is located.

7. The method according to claim 6, further comprising:

acquiring updated initial display parameters of the plurality of the display pixels in a subarea of the at least two subareas in response to updates to the initial display parameters of at least part of the plurality of the display pixels in the subarea of the at least two subareas;

updating an actual temperature of the subarea of the at least two subareas according to the updated initial display parameters of the plurality of the display pixels in the at least two subareas and the ambient temperature of the at least two subareas; and updating a compensation gamma table of the subarea of the at least two subareas according to the updated actual temperature of the subarea of the at least two subareas and providing the updated compensation data signals to the plurality of the display pixels in the subarea of the at least two subarea according to the updated compensation gamma table of the subarea of the at least two subareas.

8. The method according to claim 6, wherein the initial display parameters of a plurality of display pixels in the at least two subareas include a plurality of grayscale values corresponding to the plurality of display pixels in the at least two subareas, and the method further includes:

adjusting compensation data signals provided to at least part of the plurality of display pixels of a same color in response to a presence of at least two adjacent display pixels of the same color with a same grayscale value in the at least two subareas with different compensation gamma tables, so that a difference between the compensation data signals of every two adjacent display pixels of the same color is within a preset value, the compensation gamma table including a plurality of grayscale values and a compensation data signal corresponding to each grayscale value and the compensation data signals corresponding to at least part of the plurality of grayscale values in different compensation gamma tables are different.

9. The method according to claim 8, wherein adjusting the compensation data signals provided to at least part of the plurality of display pixels of the same color includes:

adjusting the compensation data signals provided to the at least part of the plurality of display pixels of the same color in response to the presence of at least two adjacent display pixels of the same color with the same grayscale value in the at least two subareas with different compensation gamma tables, a maximum difference of the compensation data signals in at least two same-color display pixels being X, and the two display pixels of the same color whose difference of the compensation data signal is X being separated by at most Y display pixels of the same color in a first direction, so that the compensation data signals corresponding to two adjacent display pixels of the same color in a second direction are the same, and a difference between the compensation data signals corresponding to two adjacent display pixels of the same color in the first direction is X/(Y+1), the first direction intersects the second direction, and Y is a positive integer.

10. A color shift compensation method for a display panel including a plurality of display pixels arranged in rows and columns, comprising:

acquiring initial display parameters of a plurality of display pixels and an ambient temperature of the display panel;

determining an actual temperature of the display panel according to the initial display parameters of the plurality of display pixels and the ambient temperature of the display panel;

determining a compensation gamma table of the display panel according to the actual temperature of the display panel;

providing compensation data signals to the plurality of the display pixels according to the compensation gamma table;

acquiring actual luminescence data of the plurality of display pixels after the plurality of display pixels emits light according to the compensation data signals; and providing secondary compensation data signals to at least part of the plurality of display pixels based on the actual luminescence data.

11. A display device, comprising:

a display panel including a plurality of display pixels arranged in rows and columns;

an image decoding module, configured for acquiring initial display parameters of the plurality of display pixels;

a temperature acquisition module, configured for acquiring the ambient temperature of the display panel;

an integrated processing module, configured for, in response to the ambient temperature of the display panel being higher than a set temperature threshold, determining an actual temperature of the display panel based on the initial display parameters of the plurality of display pixels and the ambient temperature of the display panel; and a display driver module, configured for determining a compensation gamma table of the display panel according to the actual temperature of the display panel, and providing compensation data signals to the plurality of display pixels according to the compensation gamma table of the display panel.

12. The display device according to claim 11, wherein:

the image decoding module is specifically configured for acquiring initial display parameters of each display pixel of the display panel in a preset display area;

the temperature acquisition module is specifically configured for acquiring an ambient temperature of the display panel in the preset display area; and the integrated processing module is specifically configured for:

determining an average power consumption density of the display panel in the preset display area according to the initial display parameters of each display pixel of the display panel in the preset display area, an area of the preset display area and a validity time of the initial display parameters of each display pixel of the display panel, and determining an actual temperature of the display panel in the preset display area according to the average power consumption density of the display panel in the preset display area and the ambient temperature of the display panel in the preset display area.

13. The display device according to claim 12, wherein the integrated processing module includes registers.

14. The display device according to claim 11, wherein:

the display panel includes at least two subareas, each of the at least two subareas includes a plurality of display pixels;

the image decoding module is specifically configured for acquiring initial display parameters of the plurality of display pixels in the at least two of the subareas respectively;

the temperature acquisition module is specifically configured for acquiring ambient temperatures of the at least two subareas respectively;

the integrated processing module is specifically configured for determining actual temperatures of the at least two subareas respectively according to the initial display parameters of the plurality of display pixels in the at least two subareas and the ambient temperature of the at least two subareas; and the display driver module is specifically configured for determining compensation gamma tables of the at least two subareas respectively according to the actual temperatures of the at least two subareas and providing compensation data signals to the plurality of display pixels according to a compensation gamma table of the at least two subareas where the plurality of display pixels is located.

15. The display device according to claim 14, wherein the temperature acquisition module includes at least two temperature sensors in one-to-one correspondence with the at least two subareas, and a temperature sensor of the at least two temperature sensors is configured for acquiring an ambient temperature of a corresponding subarea of the at least two subareas.

16. The display device according to claim 15, wherein the display panel includes a display area and a non-display area on at least one side of the display area, the display area includes a light-transmitting area, and in a thickness direction of the display panel, the at least two temperature sensors at least partially overlap the non-display area of the display panel.

17. The display device according to claim 16, wherein each subarea is adjacent to the non-display area.

18. The display device according to claim 14, wherein:

the display panel includes a display area and a non-display area, the display area includes a light-transmitting area and a circuit area, a light transmittance of the light-transmitting area is higher than a light transmittance of the circuit area and the display pixels is in the circuit area;

the temperature acquisition module includes data processing circuits and temperature measurement wirings, at least part of a temperature measurement wiring of the temperature measurement wirings is in the circuit area, and each subarea includes at least part of a temperature measurement wiring of the temperature measurement wirings;

in a thickness direction of the display panel, a data processing circuit of the data processing circuits at least partially overlaps the non-display area of the display panel; and a temperature measurement wiring of the temperature measurement wirings is electrically connected to a data processing circuit of the data processing circuits, the data processing circuit is configured for measuring a resistance value on the temperature measurement wiring, and acquiring an ambient temperature of a corresponding subarea according to the resistance value on the temperature measurement wiring.

19. The display device according to claim 18, wherein:

in a first direction, an extension length of a temperature measurement wiring of the temperature measurement wirings is greater than or equal to half of a length of a corresponding subarea;

in a second direction, a difference in distance between the temperature measurement wiring and two edges of the corresponding subarea is less than or equal to half of a width of the subarea; and the first direction intersects the second direction.

* * * * *